Figure 1:
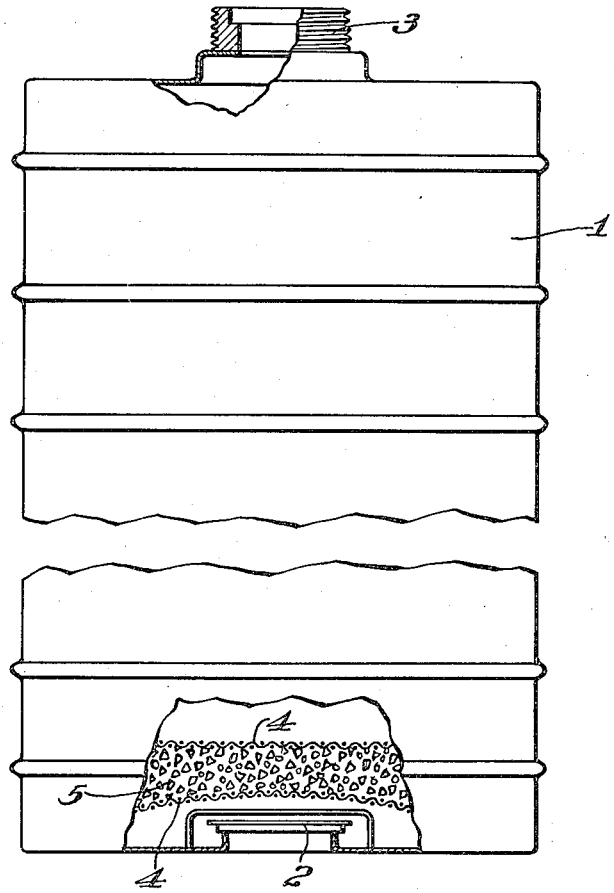

March 28, 1939.　　M. L. MYERS ET AL　　2,151,792

METHOD FOR PURIFYING AIR FOR BREATHING

Filed Nov. 2, 1935

INVENTORS
Myron L. Myers
and Edwin J. Marris
BY Brown, Critchlow & Flick
Their ATTORNEYS.

Patented Mar. 28, 1939

2,151,792

UNITED STATES PATENT OFFICE 2,151,792

METHOD FOR PURIFYING AIR FOR BREATHING

Myron L. Myers, Elizabeth, N. J., and Edwin J. Morris, Richmond County, N. Y.

Application November 2, 1935, Serial No. 48,058

6 Claims. (Cl. 23—4)

In order that the present development to the known art may be realized, a brief summary is herein included of those methods now in vogue relating to persons employed, exposed to, or in contact with, volatile metallic poisons and metals or metallic dust in solution or suspension, or compounds thereof as in gases, fumes, liquids or other metallic volatile compounds.

The present methods for the prevention of metallic poisoning through inhalation of noxious metallic poisons, either as a metal, as compound, or in suspension, or liquid suspension, have relied upon the use of various types of so-called gas masks and respirators.

These may be generally classified as follows:

1. Pump or air type in which fresh air is supplied from external source to the person or persons exposed to the noxious metallic fumes, gases, vapors, liquids or other metallic volatile compounds.

2. Respirator type which is a gas mask with a container containing a carbonaceous filter which, as is well known to the art, is porous and allows the gas to pass through to the respiratory organs. During the passage of the gas laden air through the carbonaceous filter some of the metals in suspension in the metallic fumes, gases, or vapors by mechanical action may or may not be lodged on the surfaces of the pores of the carbonaceous filter.

It is a well known fact that the use of gas masks of the pump or direct ventilating type (1) are limited in their application and to the wearer thereof due to the difficulty of breathing and the efficiency of the wearer is decreased together with the work impeded due to the cumbersome and discomfortable equipment necessary.

Type 2 (masks and respirators), depending upon mechanical and/or chemical removal of the noxious metallic fumes must necessarily be large in capacity, because of the canister or container of activated charcoal or carbonaceous material, and therefore since these are suspended from the face of the user, are uncomfortably inconvenient and in most cases ineffective for the prevention of metallic poisoning.

Experience has shown that the two types of masks commercially available for the removable of noxious metallic fumes are based on the use of activated charcoal, mechanical filters, such as pumice, sponges, cotton felt or cellulose pads to which may be added chemical compounds, namely, soda lime, etc. As is well known to the art soda lime does not react with the metallic fumes, vapors, gases, liquids or metallic volatile compound and does not prevent metallic poisoning but the soda lime is used primarily for the elimination of carbon dioxide and the absorption of moisture. Experience has shown that the mechanical or type 2 gas masks or respirators commercially available are to be used for light concentrations of noxious metallic fumes. These are to a degree effective for the elimination of carbon dioxide fumes but are ineffective for the prevention of metallic poisoning when used in the presence of noxious metallic vapors, gases, fumes, liquids or metallic volatile compounds.

Our invention, in view of the experience we have had with the above outlined commercial types now on the market, relates to the novel use of phosphates for reaction with noxious metallic fumes in large or small amounts, whether in volatile metallic state or as soluble metallic compounds, in liquid or gaseous suspension.

Figure 2:
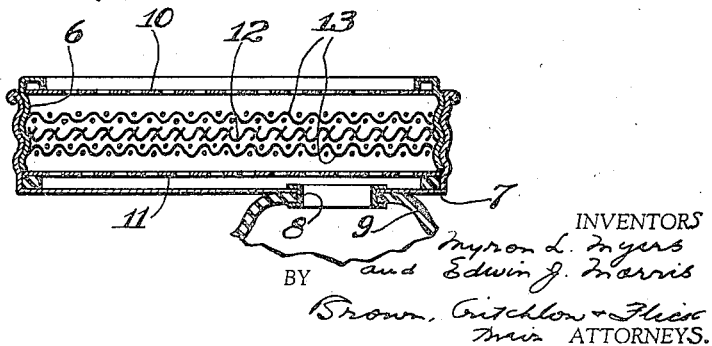

The invention will be described with reference to the accompanying drawing in which Fig. 1 is a vertical elevation, partly in section, of a mask canister embodying the invention; and Fig. 2 a cross-sectional view through a canister for association with a respirator.

The efficiency of the use of phosphates for the prevention of metallic poisoning by inhalation of noxious metallic vapors, fumes, gases, liquids or metallic volatile compounds is based upon the chemical reaction of said noxious metallic vapors, fumes, gases, liquids or volatile metallic compounds with said phosphates so as to render them insoluble and thereby be retained upon and/or within a suitable container or filter.

By way of illustration, the following chemical reactions are cited:

(1) $3ZnO$ plus $2Na_2HPO_4$ plus $H_2O$ yields $Zn_3(PO_4)_2$ plus $4NaOH$.

(2) $3ZnO$ plus $2Na_2HPO_4$ plus $5H_2O$ yields $Zn_3(PO_4)_2.4H_2O$ plus $4NaOH$.

(3) $3ZnO$ plus $2Na_2HPO_4$ plus $9H_2O$ yields $Zn_3(PO_4)_2.8H_2O$ plus $4NaOH$.

(4) $ZnO$ plus $2Na_2HPO_4$ plus $3H_2O$ yields $ZnH_4P_2O_8.H_2O$ plus $4NaOH$.

(5) $2ZnO$ plus $2Na_2HPO_4$ plus $H_2O$ yields $Zn_2P_2O_7$ plus $4NaOH$.

These reactions are cited as typical and it is not our purpose to limit this invention to these compounds but to include like reactions with all other noxious metallic vapors or compounds. Thus, lead, mercury, etc., as vapors or volatile compounds, in suspension or solution react with the di-sodium (secondary) phosphate and other phosphates, to produce insoluble metallic phosphates as may be realized by those skilled in the art.

We prefer to use neutral secondary di-sodium, di-ammonium, etc., phosphates for this purpose. We impregnate thin layers of cellulose or cloth with one or the other above mentioned phosphates which are then installed in a suitable light respirator mask fitting tightly over the nose and mouth so that the wearer inhales through the above phosphate saturated filter and exhales through a suitable check valve. It has been found that the use of closely woven textile fibre cloth or cellulose of one mm. thickness saturated with a strong solution of di-sodium or di-ammonium phosphate is effective for a period of direct exposure to dense zinc, lead or other metallic fumes, gases, vapors, liquids or metallic volatile compounds, for a period of many hours. It is obvious to the art that the presence of moisture is necessary for the effectiveness of the phosphates.

It is not our intention that these phosphates be considered for the fireproofing of any carbonaceous filter materials since such is well known to the art. Furthermore, as may be seen by referring to the typical reactions cited for metallic vapors with phosphates the amounts of phosphates used must necessarily be present in relatively large amounts in proportion to the suitable carrier media such as cellulose, cloth, asbestos, pumice, sponge, etc.

As we mentioned above the fundamental principle of this invention is based upon the formation of insoluble phosphates by the reaction of the metallic vapors in suspension as oxides or other compounds, with phosphate impregnated screen or other inert carrier media, wherein by a combination of the chemical and mechanical reaction these poisonous metallic vapors are entrained and/or absorbed.

Other than the above suggested method of this invention there are many adaptations such as the use of solid phosphates in a suitable container for removing poisonous metallic fumes, vapors, gases, liquids or metallic volatile compounds, siliceous and other materials by absorption, chemical reaction, therewith and thereon, and by mechanical action. Thus it will seem obvious that it is possible for the use of mask or respirator device of any type which may depend for their efficiency upon the use of various phosphates for the removal of not only metallic poisons in solution in suspension as compounds or as metals or combinations thereof or suspended siliceous materials or other materials organic or inorganic.

The application of the invention to apparatus as referred to hereinabove is illustrated in the accompanying drawing. Fig. 1 shows a gas mask canister 1 of conventional form provided with air inlet and outlet openings 2 and 3 each provided with check valves, not shown, of any suitable form, such as those now known in the art. Disposed between screens 4 mounted within the canister is a body 5 of granular material in accordance with the invention, such as pumice or the like impregnated with, as described hereinabove, a soluble secondary phosphate. Fig. 2 represents a form of canister commonly used with respirators. It comprises a casing member 7 connected by a crimped ring 8 to the respirator body 9. The side wall of casing 7 is provided with screw threads which receive a complementarily threaded canister 6 having perforated top and bottom members 10 and 11, respectively. Disposed within the canister is a member 12 in the form of woven cloth disposed between screen members 13. Cloth 12 is impregnated with a soluble secondary phosphate as described hereinabove. In this device the air enters through top member 10 and after passing through member 12 passes through the bottom member 11 and thence through ring 8 into the respirator body. Members 10 and 8 thus act, respectively, as air inlet and outlet openings. In the use of both forms of apparatus, as will be seen, all of the air passing into the face-piece is compelled to pass through the phosphate thus removing noxious materials as described hereinabove.

We claim:

1. That method of treating air vitiated by vapors or fumes of material of the group consisting of metal or metal compound, to render it fit for breathing, which comprises passing said vitiated air into contact with a moist soluble phosphate and thereby removing said material and rendering the air fit for breathing.

2. That method of treating air vitiated by vapors or fumes of material of the group consisting of metal or metal compound, to render it fit for breathing, which comprises passing said vitiated air into contact with a moist soluble alkali metal phosphate and thereby removing said material and rendering the air fit for breathing.

3. That method of treating air vitiated by vapors or fumes of material of the group consisting of metal or metal compound, to render it fit for breathing, which comprises passing said vitiated air through a mass of moist soluble phosphate supported on an inert carrier.

4. That method of treating air vitiated by vapors or fumes of material of the group consisting of metal or metal compound, to render it fit for breathing, which comprises passing said vitiated air through a mass of moist soluble alkali metal phosphate supported on an inert carrier.

5. That method of treating air vitiated by vapors or fumes of material of the group consisting of metal or metal compound, to render it fit for breathing, which comprises passing said vitiated air through a mass of moist sodium phosphate supported on an inert carrier.

6. That method of treating air vitiated by vapors or fumes of material of the group consisting of metal or metal compound, to render it fit for breathing, which comprises passing said vitiated air through a mass of moist disodium phosphate supported on an inert carrier.

MYRON L. MYERS.
EDWIN J. MORRIS.